United States Patent [19]

Luper

[11] Patent Number: 4,537,058

[45] Date of Patent: Aug. 27, 1985

[54] VOLUME CALIBRATION SYRINGE

[75] Inventor: Charles R. Luper, Anaheim, Calif.

[73] Assignee: Sensormedics Corporation, Anaheim, Calif.

[21] Appl. No.: 395,171

[22] Filed: Jul. 6, 1982

[51] Int. Cl.³ .................... G01D 18/00; G01F 25/00; G01N 37/00

[52] U.S. Cl. .......................................... 73/1 G; 73/3; 73/864.87; 604/186

[58] Field of Search ............... 73/3, 1 H, 1 G, 864.62, 73/864.87, 864.85; 604/135, 186, 183, 210, 208, 207

[56] References Cited

U.S. PATENT DOCUMENTS

| | | | |
|---|---|---|---|
| 544,014 | 8/1895 | Terramorse | 604/135 |
| 640,868 | 1/1900 | Bring | 604/135 |
| 1,434,198 | 10/1922 | Calhoun | 73/3 |
| 1,643,744 | 9/1927 | Lowenfeld | 604/183 X |
| 2,221,739 | 11/1940 | Reiter | 604/210 X |
| 3,146,620 | 9/1964 | Morril, Jr. | 73/149 |
| 3,270,548 | 9/1966 | Marbach . | |
| 3,425,262 | 2/1969 | Herzog | 73/3 |
| 3,824,859 | 7/1974 | Harris, Sr. et al. | 73/864.87 |
| 3,882,729 | 5/1979 | Roach | 222/309 X |
| 4,196,618 | 4/1980 | Patterson | 73/149 |
| 4,448,058 | 5/1984 | Jaffe et al. | 73/1 G X |

FOREIGN PATENT DOCUMENTS 626386  9/1978  U.S.S.R. ............... 73/864.62

Primary Examiner—Stewart J. Levy
Assistant Examiner—Tom Noland
Attorney, Agent, or Firm—Lyon & Lyon

[57] ABSTRACT

A calibration syringe for controllably delivering gas to a respiratory gas measuring instrument during the calibration thereof. In addition to the piston and cylinder arrangement used in prior syringes, the calibration syringe of the invention includes several improvements which enhance the accuracy and repeatability of the volume of gas delivered thereby. One improvement comprises a modified inlet-outlet design which assures a positive shutoff of the flow of gas at the end of an ejection stroke. A second improvement comprises the provision of a spring-loaded mechanism for automatically propelling the piston at any of several operator selectable rates. Finally, the calibration syringe of the invention includes a latching arrangement which assures that each ejection stroke begins from the same starting position and is initiated in a way that minimizes operator-related effects.

24 Claims, 4 Drawing Figures

VOLUME CALIBRATION SYRINGE

BACKGROUND OF THE INVENTION

In calibrating instruments that are used to measure the volume and the concentrations of various gases in breath, it has long been the practice to supply the instruments with a pulsatile flow of calibration gas (usually air) from a device known as a calibration syringe. This syringe typically includes a piston and cylinder arrangement which pumps gas to the instrument, through a check valve, as the operator moves a handle that is connected to the piston between first and second positions. Because the cylinder ordinarily has a volume comparable to the volume of gas that is exhaled during a typical human breath, and because the ejection stroke of the piston takes about the same time as an exhaled breath, the use of the calibration syringe allows the instrument to be calibrated under conditions that simulate the conditions under which it will be used with test subjects.

The use of syringes of the above-described type has been found to result in sizable errors in the volume of gas supplied during calibration. One of these errors, known as "siphoning", results from the fact that the inertia of the gas flowing through the check valve has a tendency to keep that check valve open even after the piston has reached the end of its stroke. Such siphoning affects the accuracy of the calibration process by causing the actual volume of gas supplied to the instrument to be larger than might to be expected on the basis of the volume of the calibration syringe.

Another type of error, known as stroke speed error, is caused by the fact that the number of pulses produced by a gas turbine that monitors the flow of gas delivered by the syringe can vary over wide limits depending upon how fast the operator pushes the piston during its ejection stroke. As a result of this error, the apparent volume of gas delivered by the syringe during calibration (as measured by the turbine) can differ substantially from the actual volume of gas delivered, thereby affecting the accuracy of the volume calibration. The latter errors, in turn, introduce errors into all later measurements that are based on the inaccurate calibration.

Still another type of error that is associated with the use of manually operated calibration syringes is caused by the fact that, due to operator inattention, the piston may not be moved between exactly the same beginning and end positions during each ejection stroke. An operator may not, for example, withdraw the piston to its true outermost position, or may not push the piston to its true innermost position. Any such deviations from the desired inner and outer positions, of course, affect the volume of gas delivered by the syringe during calibration. These errors, in turn, affect the accuracy of all measurements that are based on the inaccurate calibration.

SUMMARY OF THE INVENTION

In accordance with the present invention, there is provided an improved volume calibration syringe which is not subject to the above-described errors. One respect in which the syringe has been improved comprises the provision of modified flow paths through which gas may enter and exit the syringe. More particularly, by separating the inlet and outlet paths through which calibration gas flows through the syringe, it is possible for the flow of calibration gas in the outlet line of the syringe to be suddenly and positively shut off when the piston reaches the end of its stroke. As a result of this positive cutoff feature, any tendency for siphoning to occur is substantially eliminated, thereby improving the accuracy of the overall volume calibration process.

A second respect in which the volume calibration syringe of the invention has been improved comprises the provision of spring-loaded means for propelling the piston during its ejection stroke. By means of this improved propelling arrangement the effect of random, operator-related variations in the velocity profile of the piston during a series of ejection strokes are eliminated, thereby greatly improving the accuracy and repeatability of the output signal produced by the gas turbine. The latter improvements in turn, result in an improvement in the accuracy of the volume calibration process as a whole, and thereby improve the accuracy of all subsequent measurements.

A third respect in which the volume calibration syringe of the invention has been improved comprises the provision of a latch and release mechanism whereby the piston is forced to assume a precisely defined position at the beginning of each ejection stroke and to begin its stroke in a repeatable way. By establishing a precise starting position for the piston, the latch portion of the mechanism eliminates the volume errors that result from incomplete strokes. By automating the release of the piston, the release portion of the mechanism eliminates the errors that can occur, even in a mechanically driven piston, as a result of the way in which the ejection stroke is initiated. Together the latch and release mechanisms eliminate a significant source of error in the volume calibration process.

The syringe of the invention has also been improved by providing it with a flow control arrangement whereby the rate at which gas is admitted into the rear of the syringe during its ejection stroke may be limited to a selectable value. By limiting the rate of this "backflow" to one of a plurality of selectable values, the speed of the piston may be controlled so that the volume calibration syringe delivers its known volume of gas at a number of different rates. The availability of these different delivery rates make it possible to use a single syringe to calibrate the gas turbine at a number of different regions of its nonlinear operating characteristic. Such multi-region calibration, in turn, assures that, when the instrument is connected to a test subject, measurements can be made with high accuracy in spite of large variations in the rate of flow of gases from that test subject.

DESCRIPTION OF THE DRAWINGS

Other objects and advantages of the present invention will be apparent from the following description and drawings in which.

DESCRIPTION OF THE PREFERRED EMBODIMENTS

Figure 1:
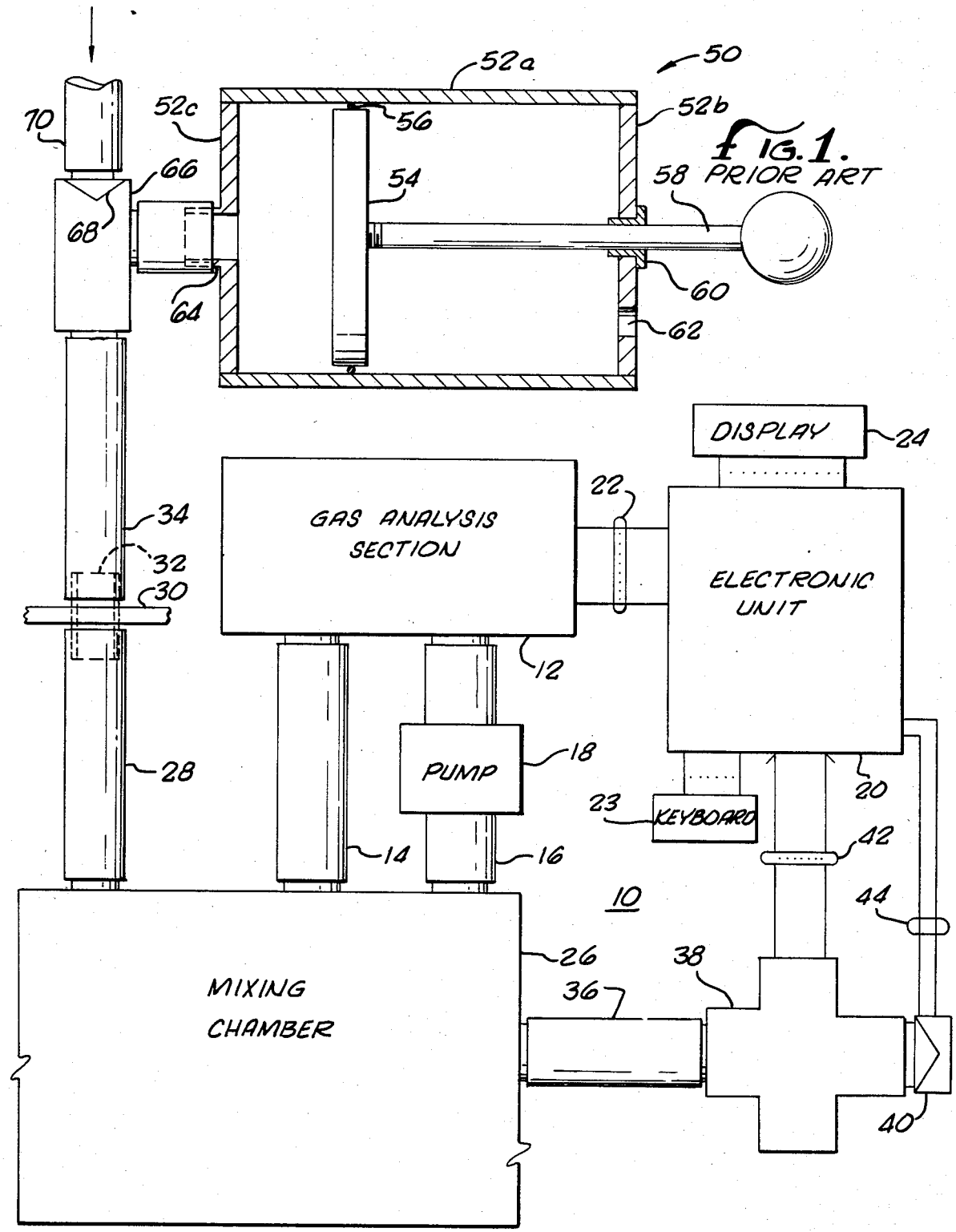
FIG. 1 is a block diagram of a respiratory gas measuring instrument that is connected to a a calibration syringe of a type that is known in the art.

Referring to FIG. 1, there is shown a block diagram of a respiratory gas measuring instrument 10 which is shown connected to a known type of volume calibration syringe 50. Generally speaking, instrument 10 includes a gas analysis section 12 having an inlet 14 and an outlet 16. In operation, the gas to be measured is circulated through section 12 by a pump 18 which is located in outlet line 16. Instrument 10 also includes an electronic control unit 20 which controls and gathers information from gas analysis section 12, through a set of electrical conductors 22, in accordance with the commands entered by an operator through a suitable keyboard 23. After being processed in control unit 20, the results of the gas measurement process are made available to the operator via a suitable display device 24.

The gas flowing through gas analysis section 12 is ordinarily supplied thereto from a mixing chamber 26 which, by mixing newly introduced gas with previously introduced gas, smooths out the gas flow fluctuations that are associated with gas that is supplied from a pulsatile source such as a human test subject. Newly introduced gas flows into mixing chamber 26 through an inlet line 28 which may be connected either to a line carrying the gas exhaled by a test subject or to a source of calibration gas such as syringe 50. The selection of one of these sources is accomplished by manually coupling the outlet line of the desired source to line 28, at an interface panel 30, which is provided with a suitable connector 32. Mixing chamber 26 is also provided with an outlet line 36 through which gas that is displaced by newly entering gas may be vented to the atmosphere.

To the end that the volume of gas flowing into mixing chamber 26 may be accurately monitored and taken into account by control unit 20, outlet line 36 is connected in series with a known gas turbine 38 and a combination check valve/breath switch 40. Turbine 38 is preferably of the type that produces a succession of electrical output pulses the number of which varies in accordance with the volume and rate of flow gas flowing therethrough. Turbine 38 may, for example, include a low inertia turbine blade that is driven by the gas flow stream, the blades of the turbine serving to interrupt the transmission of light between LED and phototransistor pairs to produce a succession of electrical pulses on the lines 42 which connect turbine 38 to control unit 20. It will be understood, however, that in general any type of gas flow sensor may be used in providing the desired volume information to control unit 20.

Check valve/breath switch 40 works with turbine 38 and has a dual function. On the one hand it is a check valve which prevents air from entering mixing chamber 26 through outlet line 36. At the same time valve 40 acts as a breath operated switch which provides to control unit 20, over conductors 44, an electrical signal that indicates the beginning and ending of each breath. This information, together with the output of turbine 38, allows control unit 20 to accurately interpret the volume of each breath. In order to do so, however, control unit 20 must be calibrated in terms of the number of turbine output pulses that are produced by a known volume of gas at a known flow rate.

In order that control unit 20 may accurately correct for variations in the volume and rate of flow of gas exhaled by a test subject, it is desirable to calibrate instrument 10 with a pulsatile flow of a calibration gas having a volume and flow rate that is similar to that which occurs during the making of actual measurements. The process of calibrating instrument 10 under these conditions is commonly referred to as the gas volume calibration process. Prior to the present invention, the desired pulsatile flow of calibration gas was produced by using a gas volume calibration syringe 50 of the type illustrated in cross section at the top of FIG. 1. This syringe typically included a housing comprising a cylindrical central section 52a and first and second end plates 52b and 52c, respectively. Slidably mounted within the housing was a piston 54 which was sealed in a gas-tight relationship to housing section 52a by an O-ring 56. In order to supply a sample of gas, piston 54 is moved from a first, outer position near end plate 52b, to a second, inner position near end plate 52c, the movement of the piston in this direction being known as an "ejection stroke". During an ejection stroke, piston 54 is usually propelled by an operator, by means of a shaft 58, the latter being slidably mounted in cylinder end plate 52b by a suitable bushing 60. During each ejection stroke the partial vacuum that tends to arise behind the trailing edge of piston 54, is relieved by the in-flow of gas through a pressure relief hole 62 in end plate 52b.

In order to prevent the back flow of gas through line 34 during the intake stroke of piston 54, it has been the practice to connect the outlet nipple 64 of syringe 50 to line 34 through a T-shaped connector 66 having a check valve 68. During the intake stroke of piston 54, check valve 68 opens to allow air flowing into air inlet line 70 to fill the left end region of syringe 50. During the ejection stroke of piston 54, check valve 68 closes, causing air ejected from syringe 50 to flow through lines 34 and 28 into mixing chamber 26.

Because of the inertia of the gas flowing out of syringe 50 during an ejection stroke, it often happened that, after piston 54 stopped at the end of its stroke, check valve 68 would open for a short time and admit additional gas into line 34. Such additional gas naturally had the effect of increasing the volume of gas entering mixing chamber 26 and thereby increasing the number of pulses produced by turbine 38. In addition, because of slight differences in the way that an operator pushed handle 58 during a stroke, the total number of turbine pulses produced during a stroke could vary substantially in spite of the fact that the same volume of gas was delivered each time. Finally, it not infrequently happened that an operator would not bring piston 54 to a stop at its proper innermost or outermost position. All of these factors affected the accuracy of the calibration of instrument 10 and consequently the accuracy of the post-calibration measurements made thereby.

Figure 2:
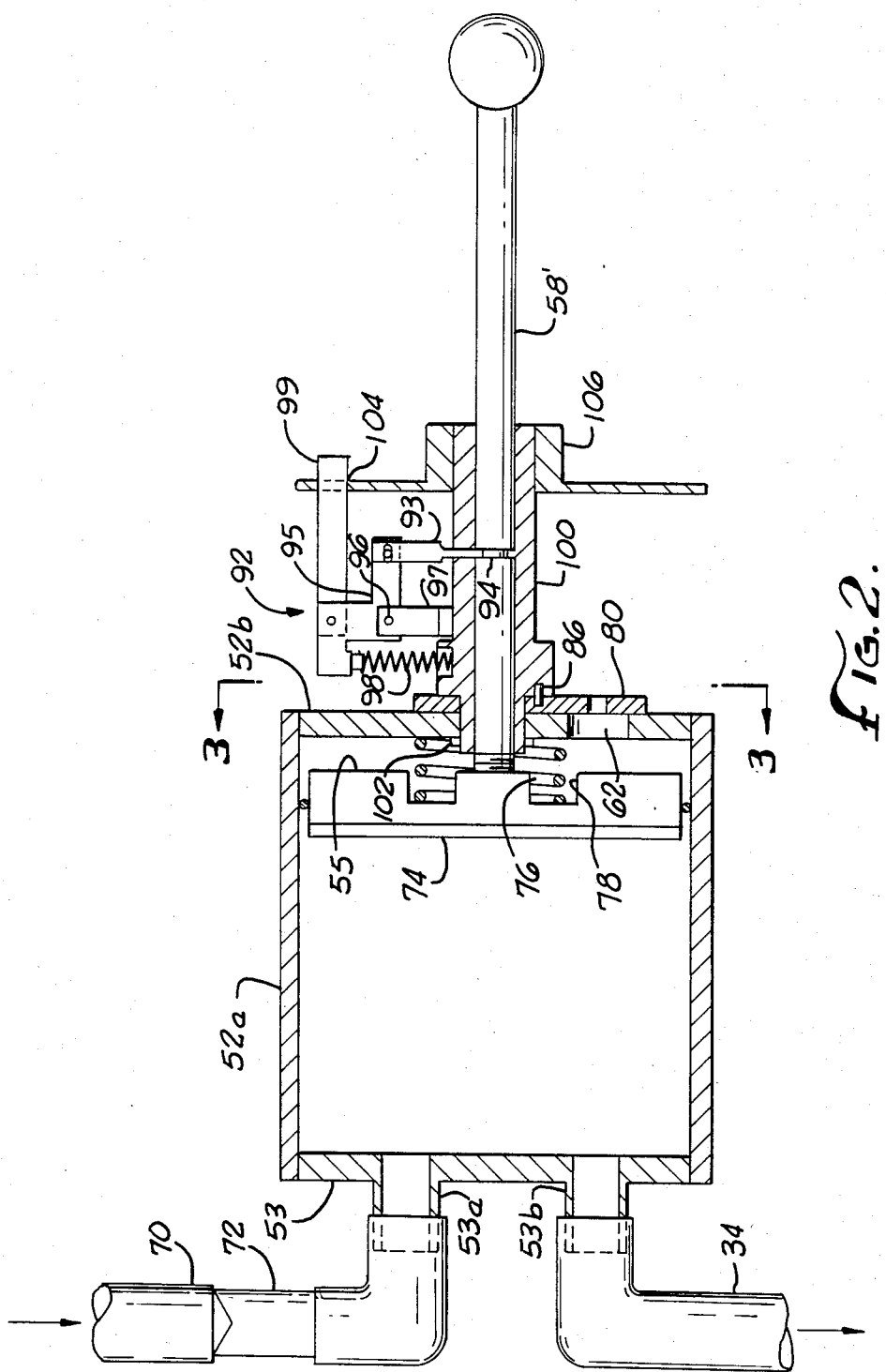
FIG. 2 is a cross-sectional view of the improved calibration syringe of the present invention.

In accordance with the present invention, the above-described errors are reduced or eliminated through the use of an improved volume calibration syringe, one embodiment of which is shown in FIG. 2. Referring to FIG. 2, the improved syringe will be seen to include a housing which is in part similar to the housing of the syringe of FIG. 1, like functioning parts being similarly numbered. More particularly, the housing of the syringe of FIG. 2 is similar to that of FIG. 1 except for the provision of an inner end plate 53 which includes separate inlet and outlet nipples 53a and 53b. The provision of these separate inlet and outlet nipples allows T-connector 66 of FIG. 1 to be eliminated, the flow cutoff function thereof being provided by a simple check valve 72 which is connected in series with inlet line 70. Particularly when these end plate modifications are used with an improved piston 55 having a rubber end covering 74, the above-described siphoning effect is entirely eliminated. The reason is that, at the end of the ejection stroke of piston 55, rubber covering 74 makes contact with end plate 53 and thereby suddenly cuts off the flow of gas in inlet line 70 and outlet line 34. This, in turn, presents the entry of the additional gas which would otherwise cause spurious counts to be produced by turbine 38.

To the end that there may be eliminated the volume calibration errors that are associated with random variations in the speed of the piston during an ejection stroke, the syringe of FIG. 2 is provided with a spring-loaded mechanism for automatically driving piston 55 during each ejection stroke. By means of this automatic drive mechanism the shape of the curve representing the velocity of the piston as a function of time (known as the velocity profile) is caused to be substantially the same for each stroke. This repeatable velocity profile, in turn, assures that, other factors being constant, there are none of the random velocity-related variations in the number of turbine output pulses which are responsible for volume calibration errors. This repeatable velocity profile also makes possible the establishment of a scaling factor which, when multiplied by the number of turbine output pulses, will yield the number of pulses that the same volume of gas would produce if it were delivered with any other repeatable velocity profile, such as that produced by a standard artificial lung or SAL. Thus, the instrument 10 of FIG. 1 can be calibrated with an accuracy similar to that available from a SAL, without the bulk and cost that is associated therewith.

In the embodiment of FIG. 2 the spring-loaded means for driving piston 55 includes a spring 76 which is compressed between piston 55 and outer end plate 52b. If desired in order to assure the centering of spring 76 with respect to piston 55, the surface of the latter may be provided with a retaining groove 78. A similar retaining groove, not shown, may also be provided on the inner surface of end plate 52b. While spring 76 is shown as acting directly on piston 55, it may be in general act on any other element through which it can exert a driving force on piston 55 during its ejection stroke. Spring 76 may, for example, act on shaft 58' and may be located either inside or outside of the housing of the syringe.

As explained previously, significant volume errors can result from random operator-related variations in the position of the piston at the start of an ejection stroke. If, for example, an operator does not withdraw piston 55 to the same outermost position prior to the beginning of a stroke, then the volume of gas delivered by the syringe will be in error by a proportional amount. In accordance with the present invention, this initial positioning error is eliminated by providing a latch mechanism 92 for stopping shaft 58' (and therefore piston 55) in a specific, well defined position prior to the beginning of each ejection stroke.

In the embodiment of FIG. 2, latching mechanism 92 includes a latching member 93 the end of which is adapted to engage an annular groove 94 in shaft 58'. The inward and outward movement of latching member 93 is controlled by a linkage 95 which pivots about a pin 96 in a mounting bracket 97 that is in turn mounted on a control member 100, which will be described presently. Latching member 93 is biased by a spring 98 which tends to automatically push the end of member 93 into groove 94 when shaft 58' is withdrawn in preparation for an ejection stroke. Because the engagement of member 93 and groove 94 is audibly and tactilely apparent to an operator, it is highly improbable that an operator will initiate an ejection stroke at any position other than that dictated by member 93 and groove 94. The effect of latch mechanism 92 is therefore to assure a repeatable starting position for the piston at the beginning of a stroke. Latching member 93 is conveniently released by means of an operator-controlled release member 99 through which spring 98 may be compressed to raise member 93 and thereby release shaft 58' and piston 55. In order to maintain the desired orientation of release member 99, the latter may be slidably mounted in a hole 104 through a plate 106 which is, in turn, attached to control member 100. From the standpoint of the operator, the release of the latching mechanism is accomplished by simply pushing the button-like end of member 99.

The desired establishment of a predetermined first end position for piston 55 may also be accomplished independently of the above-described latching action, if desired. A pair of shorted contacts may, for example, be provided on the trailing edge of piston 55 with a matching pair of contacts on the inner surface of end plate 52b. Since the circuit through these contacts will be closed only when the piston is in a known end position, the closure of the circuit may be used to energize a lamp or buzzer to signal to the operator that the syringe is ready to begin an ejection stroke. Although the use of this approach is possible, it is not preferred because of the likelihood that an operator can effect the number of turbine output pulses produced during an ejection stroke by the way in which he releases shaft 58'.

Figure 4:
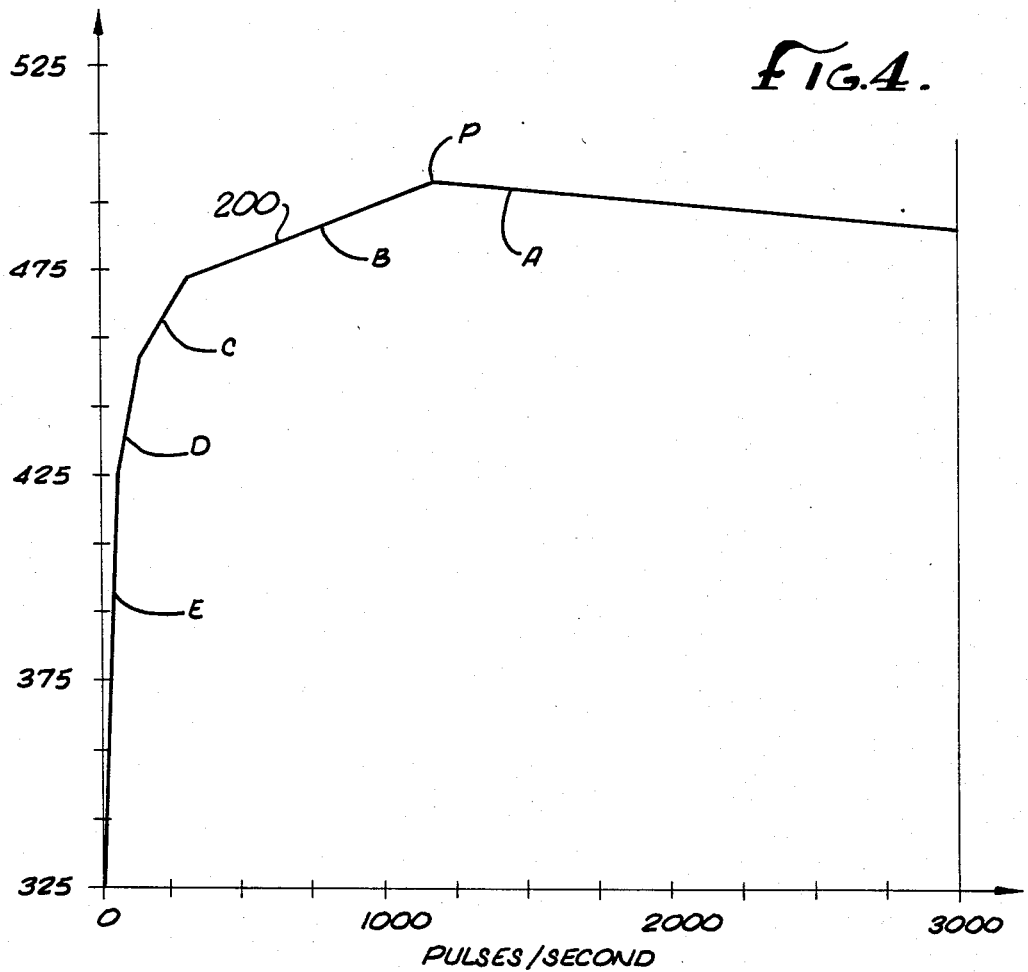
FIG. 4 is a piece-wise linear approximation of the nonlinear characteristic curve of the gas turbine of FIG. 1.

As explained previously, a known volume of gas can result in different numbers of turbine output pulses, depending upon the rate at which that volume of gas is delivered. The manner in which the number of turbine output pulses varies with the gas flow rate is shown in FIG. 4. In the latter Figure, the vertical axis has units of pulses per unit of gas volume and may, for example, represent the total number of pulses produced by turbine 38 during an ejection stroke of the syringe. The horizontal axis has units of pulses per second and is indicative of the average rate at which calibration gas flows through turbine 38. Characteristic "Curve" 200, which shows the nonlinear relationship between pulses per unit volume and pulses per second for a particular turbine, is actually a piece-wise linear approximation of a smooth, continuous nonlinear characteristic curve (not shown). This piece-wise linear approximation includes line segments A through E.

In FIG. 4, it will be seen that, for those line segments to the left of the peak value P of characteristic curve 200, an increase in the gas flow rate results in an increase in the number of pulses per unit volume of gas flow through the turbine. For flow rates above peak value P, on the other hand, an increase in the flow rate actually results in a decrease in the total number of pulses per unit volume of gas flow therethrough. In order to take the nonlinearity of curve 200 into account during calibration, it is desirable to cause the syringe to provide its known volume of calibration gas at a plurality of different rates which correspond to the slopes of at least the most frequently encountered ones of line segments A through E. As a practical matter, this involves causing the syringe of FIG. 2 to provide its known volume of calibration gas at rates corresponding to the slopes of line segments A, B and C. The manner in which the syringe provides its gas at such a plurality of selectable rates will now be described.

Figure 3:
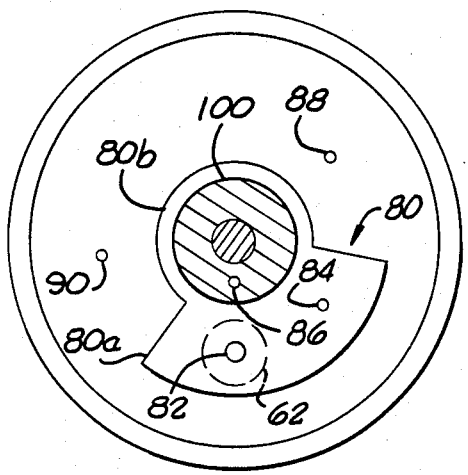
FIG. 3 is an end view taken along the line 3—3 of FIG. 2.

To the end that the syringe of FIG. 2 may deliver calibration gas at any one of a plurality of selectable rates, it is provided with an aperture control plate 80 which is shown in cross section in FIG. 2 and in elevation in FIG. 3. As is best seen in FIG. 3, aperture control plate 80 includes a plurality of holes of differing sizes, each of which may be rotated into alignment with end plate inlet hole 62 to effectively reduce the aperture thereof. By reducing the effective aperture of hole 62, the rate at which ambient air can flow into the interior of the syringe, for a given spring constant in spring 76, is effectively reduced. This limited gas inflow rate, in turn, limits the speed of movement of piston 55. As a result, in spite of the fact that spring 76 tends to establish a consistent velocity profile for the ejection stroke of the piston, aperture control plate 80 has the ability to lengthen the ejection stroke and thereby cause calibration gas to be delivered at any of a variety of different rates. The availability of these different rates, in turn, allows the instrument of FIG. 1 to be calibrated over different regions of the operating characteristic of turbine 38, such as linear segments A, B and C of FIG. 4. As a result, the instrument of FIG. 1 is made able to provide accurate readings over a wide range of sample gas flow rates.

Referring to FIG. 3, it will be seen that aperture control plate 80 includes a generally sectorshaped portion 80a, through which are drilled a plurality of holes, such as 82 and 84, and a generally circular portion 80b, the center of which is aligned with the longitudinal axis of the syringe. As shown in FIG. 2, plate 80 is held against the outer surface of end plate 52b by being positioned between that end plate and control member 100. The latter member, which is rotatably mounted on end plate 52b by a retaining clip 102, is attached to plate 80 by a pin 86. This attachment assures that, as control member 100 is rotated with respect to the syringe housing, control plate 80 rotates with it (about the center of circular portion 80b) to bring a selectable one of the holes such as 82 and 84 into alignment with aperture 62. As explained above, these holes limit the rate of gas inflow into the syringe and thereby cause the speed of piston 55 to be limited to a value corresponding to the desired selectable speed for the ejection stroke of the syringe.

While control plate 80 of FIG. 3 includes only two holes, its sector shape permits it to provide three selectable flow rates through aperture 62. Two of these flow rates are made available by holes 82 and 84; the third flow rate is available because the sector shape of plate 80 allows one edge 80a thereof to be moved to one side of aperture 62 to provide an unrestricted path for the flow of gas therethrough. In order to aid in the orientation of plate 80 in its various positions, suitable pins 88 and 90 may be provided in end plate 52b to serve as stops for the rotation of plate 80. In the illustrated example, when the right edge of plate 80 contacts stop pin 88, the left edge 80a of sector 80 will clear aperture 62 and thereby provide an unrestricted path for the flow of gas therethrough. Under this condition, piston 55 will move at a high speed, such as that corresponding to line segment A of FIG. 2. When, on the other hand, the left edge of plate 80 contacts stop pin 90, the smallest hole 84 will be aligned with aperture 62, causing piston 55 to move at a low speed, such as that corresponding to line segment C of FIG. 2. Naturally, in the intermediate position in which hole 82 is aligned with aperture 62, piston 55 will move at an intermediate speed, such as that corresponding to line segment B of FIG. 2. Because this intermediate position has no stop associated therewith, it may be desirable to provide a suitable snap-action mechanism for locking plate 80 in position when hole 82 is aligned with aperture 62.

It will be understood that, if it is desirable to have more than three selectable speeds for piston 55, these additional speeds may be provided by providing additional selectable hole sizes in plate 80. In addition, it will be understood that, while the use of a rotatable plate provides a particularly convenient mechanism for selectably limiting the rate of flow through aperture 62, the present invention contemplates any and all means for controlling the rate at which gas flows into the syringe to control the speed of the ejection stroke.

Because control member 100 is rotatably mounted on the syringe, and because plate 80 and latch mechanism 92 are mounted on member 100, an operator may, by grasping the knob 106 that is attached to member 100, rotate the entire assembly including control plate 80 and latch mechanism 92 as a single unit. This assures that the latch mechanism and the control plate can operate in the above-described manner without regard to changes in the rotational position of control member 100. The latter property, in turn, allows the syringe of FIG. 2 to be operated easily and conveniently in the following manner. First, the operator grasps knob 106 and rotates the same until the desired hole is aligned with aperture 62. Second, the operator grasps the knob on the end of shaft 58' and withdraws piston 55 until latching member 93 engages groove 94. Thereafter, to initiate a stroke, the operator need only push the end of release member 99 to initiate a precise repeatable stroke at the desired flow rate.

In view of the foregoing, it will be seen that a gas volume calibration syringe that is constructed in accordance with the present invention includes a number of improvements whereby the errors that characterized previously available syringes are eliminated. More particularly, by providing an improved arrangement for controlling the inflow and outflow of calibration gas, the present invention eliminates the errors which have been associated with "siphoning". Secondly, by providing automatic, spring-loaded means for propelling the piston during at least the ejection stroke thereof, there are eliminated the errors that have been associated with random speed fluctuations in the ejection strokes of manually operated syringes. Thirdly, by providing a clearly defined starting point for at least the ejection stroke, the present invention eliminates the volume errors that have been associated with incomplete strokes in manually operated calibration syringes. Together these features greatly improve the calibration accuracy of gas analysis instrument and thereby substantially improve the accuracy of all measurements which are referenced thereto.

What is claimed is:

1. In a gas volume calibration syringe of the type including a housing having a central section and first and second end sections, a piston slidably mounted in the housing, a shaft attached to the piston and slidably mounted in the first end section, and a gas inlet aperture in the first end section, the improvement comprising:
   (a) means for establishing a predetermined first end position for the piston in the vicinity of the first end section, (b) separate inlet and outlet openings in the second end section, the contact between one surface of the piston and at least one of said openings defining a second end position for the piston, and (c) spring-loaded means for driving the piston between said first and second end positions.

2. The calibration syringe of claim 1 in which the first end piston position establishing means comprises a latch mechanism.

3. The calibration syringe of claim 2 in which the latch mechanism includes a manually operated release member.

4. The calibration syringe of claim 2 including means for selectably restricting the rate of gas flow through said gas inlet aperture.

5. The calibration syringe of claim 4 in which the restricting means comprises a plate having a plurality of holes which may be moved into alignment with said gas inlet aperture.

6. The calibration syringe of claim 5 including a control member, for moving the restricting means, attached to the plate for mounting said latch mechanism.

7. The calibration syringe of claim 1 including means for controlling the size of said gas inlet aperture to limit the speed of movement of the piston.

8. The calibration syringe of claim 1 including means for selectably establishing a plurality of speeds for at least the ejection stroke of said piston.

9. In a gas volume calibration syringe of the type including a housing having a central section and first and second end sections, a piston slidably mounted in the central section, and a shaft attached to the piston and slidably mounted in the first end section, the improvement comprising:

(a) latching means for establishing a predetermined first end position for the piston in the vicinity of the first end section, said second end section serving to establish a predetermined second end position for the piston, (b) spring loaded means for driving the piston between its first and second end positions, and (c) a release member for controllably releasing said latching means and thereby initiating an ejection stroke of the piston, and wherein the second end section is fluidically connected to a gas measuring instrument and a source of calibration gas.

10. The calibration syringe of claim 9 including a gas inlet aperture, and means for restricting the rate at which gas can flow through the gas inlet aperture to reduce the speed of the ejection stroke of the piston.

11. The calibration syringe of claim 10 in which the restricting means provides a plurality of selectable flow rates for the flow of gas through said gas inlet.

12. The calibration syringe of claim 10 in which the restricting means comprises a plate having a plurality of holes which may be moved into alignment with said gas inlet aperture.

13. The calibration syringe of claim 10 or 12 including a control member, rotatably mounted on the first end section, for moving the restricting means.

14. The calibration syringe of claim 10 including a control member, for moving the restricting means, mounted on the first end section for supporting the latching means.

15. The calibration syringe of claim 10 including a control member, for moving the restricting means, attached to the first end section for mounting the latching means and the restricting means.

16. The calibration syringe of claim 9 in which the latching means comprises a latching member and in which the shaft includes a latching groove adapted to engage the latching member.

17. The calibration syringe of claim 16 in which the release member is adapted to disengage the latching member from said latching groove.

18. A gas volume calibration syringe of the type including a housing having a central section and first and second end sections, a piston slidably mounted in the central section, a shaft attached to the piston and slidably mounted in the first end section, the improvement comprising:

(a) a gas outlet in the second end section for connection to a gas analysis instrument, (b) a separate gas inlet in the second end section for connection to a source of calibration gas, and (c) means for selectably controlling the rate at which ambient air can flow into the syringe to occupy the space behind the trailing surface of the piston during ejection.

19. The gas volume calibration syringe of claim 18 in which the flow of gas through said gas outlet is positively cut off when the piston reaches the end of an ejection stroke.

20. The gas volume calibration syringe of claim 18 or 19 including a check valve connected in series with said gas inlet.

21. The gas volume calibration syringe of claim 18 including means for latching the piston in the vicinity of the second end section prior to the beginning of an ejection stroke.

22. The gas volume calibration syringe of claim 18 including means for driving the piston during at least the ejection stroke thereof.

23. A gas volume calibration syringe of the type including a central section and first and second end sections, a piston slidably mounted in the central section, a shaft attached to the pistion and slidably mounted in the first end section, the improvement comprising:

(a) a gas inlet in the second end section connected to a gas analysis instrument, and (b) a separate gas inlet in the second end section connected to a source of calibration gas.

(c) a means for driving the piston during at least the ejection stroke thereof.

24. A calibration syringe comprising a housing having a central section, a first and second end section, a piston slidably mounted in said central section, a shaft attached to said piston and slidably mounted in said first end section, a spring loaded means for moving said piston away from said first end section and towards said second end section, and a restriction means for controlling the rate of flow of gas into said housing between said first end section and said piston to provide a method for varying the speed of movement of said piston.

* * * * *